2,797,233

BASIC DERIVATIVES OF SUBSTITUTED OXYGENATED PHENYLPROPIONIC ACIDS AND METHODS OF PREPARING SAME

William A. Lott, Maplewood, and John Krapcho, New Brunswick, N. J., assignors to Olin Mathieson Chemical Corporation, New York, N. Y., a corporation of Virginia No Drawing. Application March 12, 1952,
Serial No. 276,228

11 Claims. (Cl. 260—473)

This invention relates to, and has for its object the provision of, compounds of the class consisting of: (A) bases of the general formula

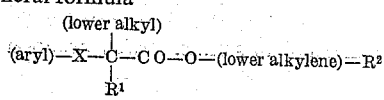

wherein X is a member of the class consisting of the —CO— and

groups, $R^1$ is a member of the class consisting of hydrogen and lower alkyl and $R^2$ is a tertiary amino group; (B) acid-addition salts thereof; (C) quarternary ammonium salts thereof; and (D) methods of preparing A, B and C. [The aryl group may be unsubstituted or may contain substituents such as lower alkyl, lower alkoxy, halogen and hydroxy groups.]

These compounds are useful and advantageous therapeutic agents, especially antispasmodics. The quarternary ammonium salts (the methyl iodide) of 2-diethylaminoethyl benzoyldimethylacetate, a compound representative of group C defined hereinbefore, may be administered orally (e. g. in tablet form) in the relief of intestinal colics, and to diminish gastric secretion in patients with gastric ulcers. The corresponding compound in the form of its hydrochloride acid-addition salt has beneficial effects when administered orally (e. g. in tablet form) in Parkinson's disease.

Among the preferred compounds are: the acid-addition salts of bases having the following general formula

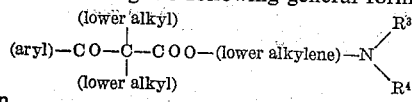

wherein

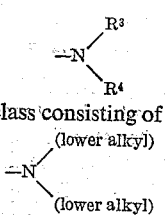

is a member of the class consisting of

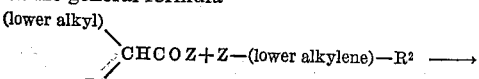

1-piperidyl, 1-pyrrolidyl and 4-morpholinyl; and quarternary ammonium salts of said bases with alkyl halides.

The basic esters in which X is —CO— (I) are prepared by a method essentially comprising interacting compounds of the general formula

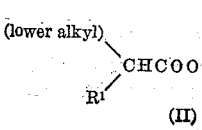

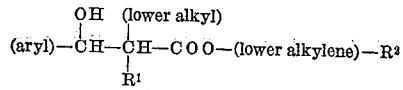

(II)

wherein $R^1$ and $R^2$ have the meaning given hereinbefore, the Z in one reactant is a halogen and the Z in the other reactant is hydroxy; and interacting the product II with an (aryl)CO—(halide), (III), in the presence of an alkaline condensing agent and in the presence of an inert organic solvent (such as toluene, benzene, and especially, ether). Thus the following compounds II and III may be used in the preparation of the compounds of the invention:

II 2-diethylaminoethyl dimethylacetate
2-[1-(3-methyl)piperidyl]ethyl dimethylacetate
2-diethylaminoethyl diethylacetate
3-dimethylaminopropyl butylethylacetate
3-diethylamino-2,2-dimethylpropyl dimethylacetate
2-diethylaminoethyl ethylacetate
2-dimethylaminoethyl dipropylacetate
2-(1-piperidyl)ethyl diethylacetate
2-(1-pyrrolidyl)ethyl dipropylacetate
4-dimethylaminobutyl diethylacetate
2-dipropylaminoethyl diethylacetate
2-(4-morpholinyl)ethyl dipropylacetate
2-(1-piperidyl)ethyl propylethylacetate

III p-Chlorobenzoyl chloride
m-Methoxybenzoyl chloride
o-Chlorobenzoyl chloride
p-Toluyl chloride
o-Hydroxybenzoyl chloride
o-Toluyl bromide
p-Ethoxybenzoyl chloride
p-Propoxybenzoyl chloride The alkaline condensing agents utilizable in the practice of this invention comprise, inter alia, sodamide, sodium hydride, lithium amide, sodium ethoxide, potassium t-butoxide, (metallic) alkali metals (such as sodium and potassium), (solid) alkali metal hydroxides (such as NaOH and KOH) and (preferably) alkali metal derivatives of tryphenylmethane. Preferably the alkaline condensing agent is dissolved or suspended in an inert organic solvent (especially ether) and this solution (or suspension) is used as the reaction medium.

Compounds in which X is

are prepared by the method essentially comprising interacting compounds of the general formula

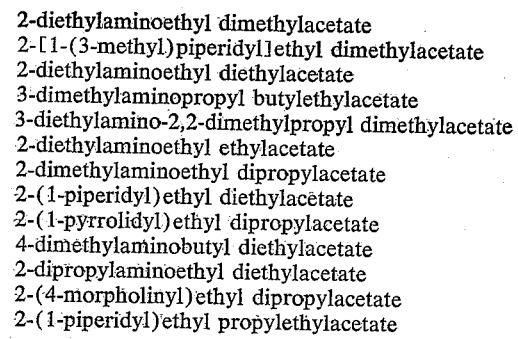

(preferably in the form of their acid-addition or quarternary ammonium salts) with hydrogen in the presence of a hydrogenation catalyst. [Alternatively, the compounds can be prepared conveniently by the following other method:

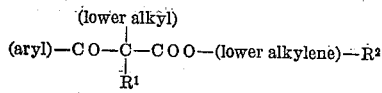

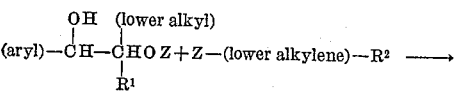

wherein $R^1$, $R^2$ and Z have the meaning given hereinbefore.]

The catalytic hydrogenation employed in the foregoing procedure may be effected with a variety of catalysts and under a variety of conditions. Generally, hydrogenation catalysts known to be effective for the conversion of a —CO— group into a

group may be employed. Among the utilizable catalysts are platinum dioxide (the Adams-platinum-oxide catalyst), Raney nickel and palladium black; carrier-supported catalysts (e. g. palladium-carbon or palladium-barium sulfate) may be used to advantage. In the case of platinum dioxide, the catalytic-hydrogenation may be effected at superatmospheric pressure (e. g. about 2 to 3 atmospheres) and/or at slightly elevated temperatures. The time of the hydrogenation (varying with catalyst and conditions employed) is that required to effect the "addition" of substantially one mole of hydrogen per mole of reactant present. The hydrogenation may be effected in any medium which does not chemically affect the reactant, inter alia, ethyl acetate, water and (preferably) absolute ethanol.

In these methods of preparing the compounds of the invention the bases may be obtained as such or in the form of their acid-addition salts (as hydrochlorides, if the halogen in the reactant is chlorine). The acid-addition salts may be converted to the free base in the conventional manner, i. e. by neutralization with alkali; and the free base may be converted to other acid-addition salts by reacting the base with the desired acid in a suitable solvent. The utilizable acids comprise: hydrobromic, boric, nitric, lactic, tartaric, citric, succinic, phosphoric, oxalic, sulfuric, maleic, fumaric and (especially) hydrochloric, inter alia.

Quaternary ammonium salts of the basic esters (A) are obtained in the usual manner by the addition of alkyl halides, dialkyl sulfates, aralkyl halides, or the like to compounds (A).

The compounds of this invention are not only therapeutically utilizable as described hereinbefore, but they can also be utilized in the preparation of other therapeutically important compounds. Thus the acid-addition and quaternary ammonium salts of the basic esters A containing

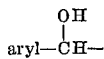

groups can be treated with acylating agents, inter alia, anhydrides (such as, acetic anhydride) and acid halides (such as, benzoyl chloride or dimethylcarbamyl chloride) to yield the corresponding esters. The following is illustrative.

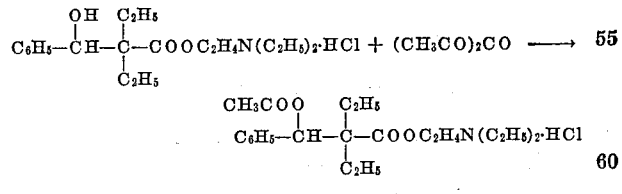

Moreover, amides corresponding to the esters I of this invention can be obtained in an analogous manner: i. e. by interacting a compound of the general formula

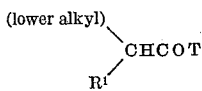

wherein T is a member of the class consisting of —O (alkyl) and halogen, with a diamine of the general formula

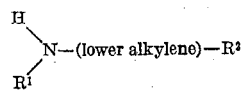

to yield a compound (IV) of the general formula

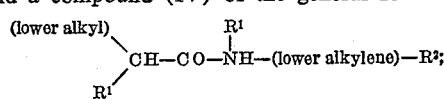

and interacting the product IV with an aroyl halide in the presence of an alkaline condensing agent; the symbols $R^1$, $R^2$ having the meaning given hereinbefore.

*Example 1*

(a) *2-diethylaminoethyl dimethylacetate:* A solution of 107 g. isobutyryl chloride in 500 ml. benzene is treated dropwise (thirty minutes) with a solution of 117 g. 2-diethylaminoethanol in 300 ml. benzene; a precipitate separates after stirring for one hour at room temperature. The mixture is refluxed for two hours, cooled and treated with 100 ml. water. The layers are separated and the organic phase extracted with another 100 ml. water. The aqueous phases are combined and made alkaline with a cold solution of 40 g. sodium hydroxide in 120 ml. water. The liberated base, 2-diethylaminoethyl dimethylacetate, is extracted with ether and dried over magnesium sulfate. After evaporation of the solvent, the residue is fractionated to yield about 75 g. of product, B. P. about 71–93° C./17 mm.

(b) To 1.4 liter of a 1.57 molar ethereal solution of triphenylmethyl sodium [Hauser, Organic Reactions, vol. I, p. 286] is added 39.3 g. 2-diethylaminoethyl dimethylacetate. After stirring the mixture for two hours at room temperature, 31 g. benzoyl chloride is added over a period of fifteen minutes and the resulting mixture allowed to stand overnight. It is then refluxed for two hours, cooled and extracted with 100 ml. water. The aqueous phase is discarded and the organic phase extracted first with a solution of 20 ml. concentrated hydrochloric acid in 100 ml. water and then with 50 ml. water. The aqueous portions are combined and made alkaline with a solution of 12 g. sodium hydroxide in 50 ml. water. The liberated base, 2-diethylaminoethyl benzoyldimethylacetate, is extracted with ether and dried over magnesium sulfate. After evaporation of the solvent, the residue is fractionated at yield about 55 g. of a colorless distillate, the free base, B. P. about 128–130° C./0.1 mm.

(c) 31.2 g. of the base is dissolved in 500 ml. of ether and treated with a slight excess of ethereal hydrogen chloride to yield about 34.5 g. of precipitate, the hydrochloride of the base, M. P. about 116–117° C. Crystallization from 70 ml. butanone yields a colorless product which weighs about 29.4 g., M. P. about 118–118.5° C., and has the following structure:

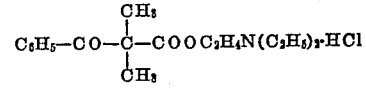

*Example 2*

A solution of 17.8 g., 2-diethylaminoethyl benzoyldimethylacetate in 100 ml. of acetone is treated with 14.2 g. methyl iodide. After standing overnight, the solution is diluted with ether and the resulting precipitate filtered and dried, yield about 25.8 g., M. P. about 95–97° C. After crystallization from 60 ml. isopropyl alcohol, the product weighs about 23.5 g., M. P. about 95–97° C., and has the following structure:

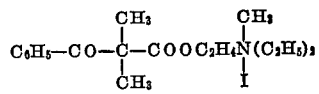

Using molar equivalents of ethyl bromide, benzyl chloride, dimethyl sulfate, or methyl p-toluene-sulfonate in place of methyl iodide in this example, the corresponding quaternary ammonium salts of 2-diethylaminoethyl benzoyldimethylacetate are obtained.

Example 3

(a) Interaction of 17.9 g. 2-diethylaminoethyl diethylacetate [J. A. P. A., Sci. Ed., 37: 243 (1948)] and 11.7 g. benzoyl chloride in the presence of 600 ml. of 0.14 mole ethereal triphenylmethyl sodium, in the manner described in Example 1, yields about 7.2 g. of the free base, 2-diethylaminoethyl benzoyldiethylacetate, a colorless product, B. P. about 165–167° C./2 mm.

(b) The base is dissolved in 100 ml. ether and treated with a slight excess of ethereal hydrogen chloride to yield a colorless precipitate, M. P. about 122.5–124° C. After crystallization from 15 ml. butanone, the product weighs about 6.6 g., M. P. about 123–124.5° C., and has the following structure:

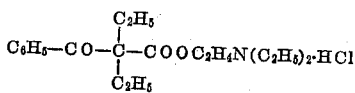

Example 4

To a solution of 5.0 g. of 2-diethylaminoethyl benzoyldiethylacetate hydrochloride, prepared as described in Example 3, in 100 ml. ethanol is added 0.1 g. platinum oxide and the mixture subjected to three atmospheres of hydrogen. After the theoretical quantity of hydrogen is consumed, the solution is filtered and solvent removed under reduced pressure. The residual solid, crystallized from a mixture of isopropyl alcohol and ether, has the following structure:

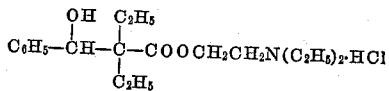

Example 5

(a) Interaction of 38.5 g. 2-diethylaminoethyl ethylpentyl acetate [J. A. P. A., Sci. Ed. 37: 243 (1948)], and 26.7 g. benzoyl chloride in the presence of 1.45 liters of 0.122 mole ethereal triphenylmethyl sodium, in the manner described in Example 1, yields about 32.5 g. of distillate, the free base 2-diethylaminoethyl benzoylethylpentylacetate, B. P. about 156–159° C./0.3 mm., $n_D^{18}$ 1.4998.

(b) Using 21.1 g. of the free base prepared in (a) the hydrochloride of the base is obtained. After purification by crystallization from a butanone-ether mixture, the product weighs about 19.5 g. and melts at about 118–119° C.

(c) The corresponding quaternary ammonium salt (the methobromide) is obtained in a manner analogous to that described in Example 2. The product, crystallized from butanone, melts at about 120–122° C., and has the following structure:

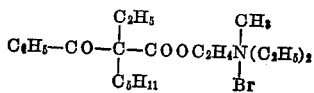

Example 6

(a) To a refluxing solution of 25.0 g. (α-hydroxybenzyl)methylacetic acid [J. C. S. 49: 159 (1886)] in 125 ml. isopropyl alcohol is added 19.0 g. 2-diethylaminoethyl chloride and the resulting solution is allowed to reflux for an additional five hours. After evaporation of the solvent at reduced pressure, the residue is dissolved in water, and the resulting aqueous solution extracted with ether and then made basic with potassium carbonate. The liberated base, 2-diethylaminoethyl (α-hydroxybenzyl)-methylacetate is extracted with ether and dried over magnesium sulfate.

(b) Addition of an ethereal solution of 12.6 g. of oxalic acid to this base solution yields an oily precipitate which solidifies on standing, M. P. about 130–133° C. Crystallization of the crude material from butanone yields a colorless crystalline product, which weighs about 22 g., M. P. about 135–136° C., and has the following structure:

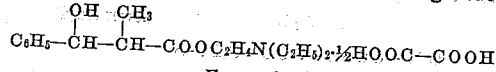

Example 7

Interaction of 25 g. dimethyl (α-hydroxybenzyl)acetic acid [Ann. Chim. Phys. (8) 23: 532 (1910)] with 17.5 g. 2-diethylaminoethyl chloride utilizing isopropyl alcohol as a solvent, and proceeding as described in Example 6, yields about 27.5 g. of the crystalline oxalate, M. P. about 107–108° C. This material, crystallized from a mixture of alcohol and ether, has the following structure:

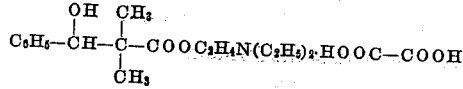

Example 8

Five grams of the oxalate described in Example 7 is dissolved in 50 ml. water and then made basic by addition of potassium carbonate. The free base is extracted with ether and dried over magnesium sulfate; and when the dry ethereal solution is treated with 3.8 g. methyl iodide, a colorless crystalline product separates. After standing at room temperature for several days, the solid is filtered; yield about 4.5 g., M. P. about 154–155° C. This product, crystallized from ethanol, M. P. about 154–155° C., has the following structure:

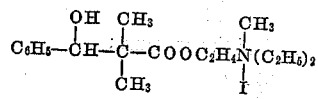

The invention may be variously otherwise embodied within the scope of the appended claims.

We claim:

1. Compounds of the class consisting of bases of the general formula

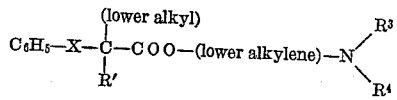

acid-addition salts thereof; and quaternary ammonium salts thereof; wherein X is a member of the class consisting of —CO— and

R' is a member of the class consisting of hydrogen and lower alkyl, and

is a member of the class consisting of

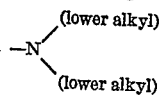

1-piperidyl, 1-pyrrolidyl and 4-morpholinyl.

2. An acid-addition salt of a base of the general formula

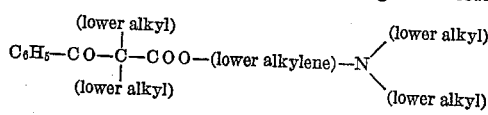

3. A quaternary ammonium salt of a base of the general formula

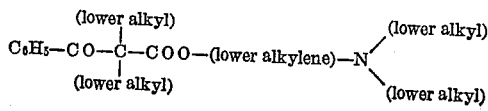

4. An acid-addition salt of a base of the general formula:

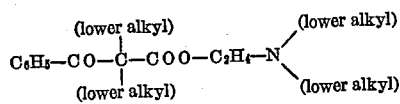

5. A quaternary ammonium salt of the general formula:

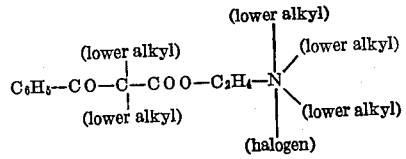

6. A compound of the formula

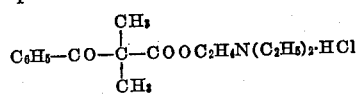

7. A compound of the formula

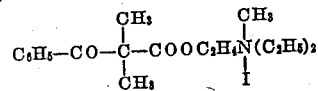

8. A compound of the formula:

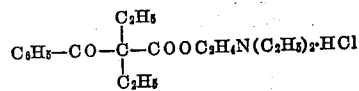

9. A compound of the formula:

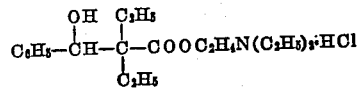

10. A compound of the formula:

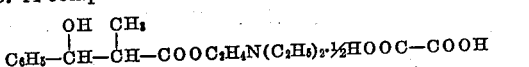

11. The method which comprises interacting a compound of the general formula

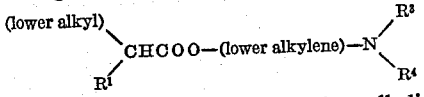

with a benzoyl halide in the presence of an alkaline condensing agent and an inert organic solvent, wherein $R^1$ is a member of the class consisting of hydrogen and lower alkyl, and

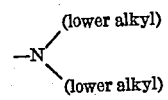

is a member of the class consisting of $$-N\begin{matrix}\text{(lower alkyl)}\\\text{(lower alkyl)}\end{matrix}$$

1-piperidyl, 1-pyrrolidyl and 4-morpholinyl.

References Cited in the file of this patent
UNITED STATES PATENTS 2,589,224   Burtner _____ Mar. 18, 1952